UNITED STATES PATENT OFFICE.

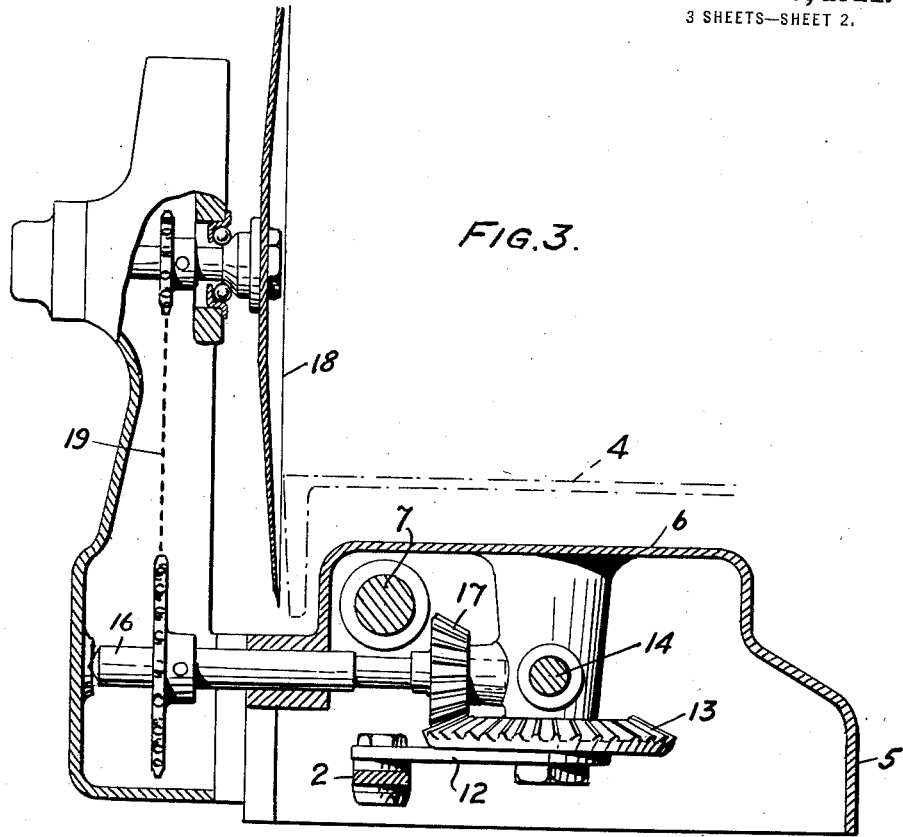
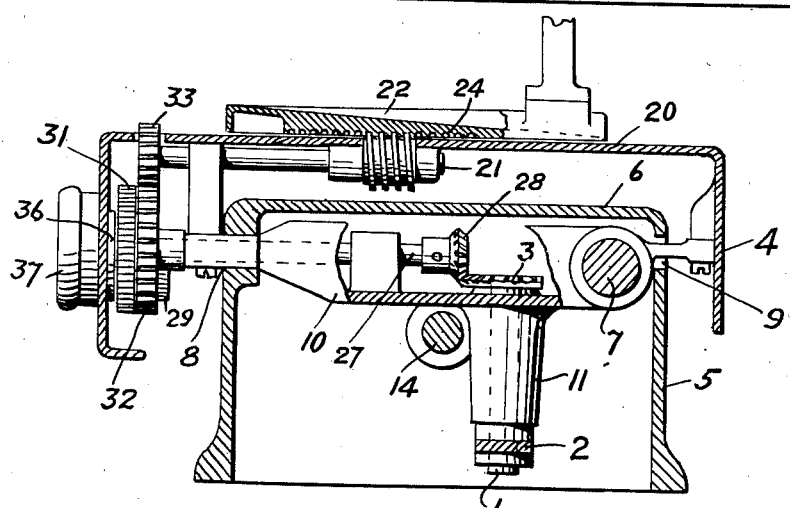

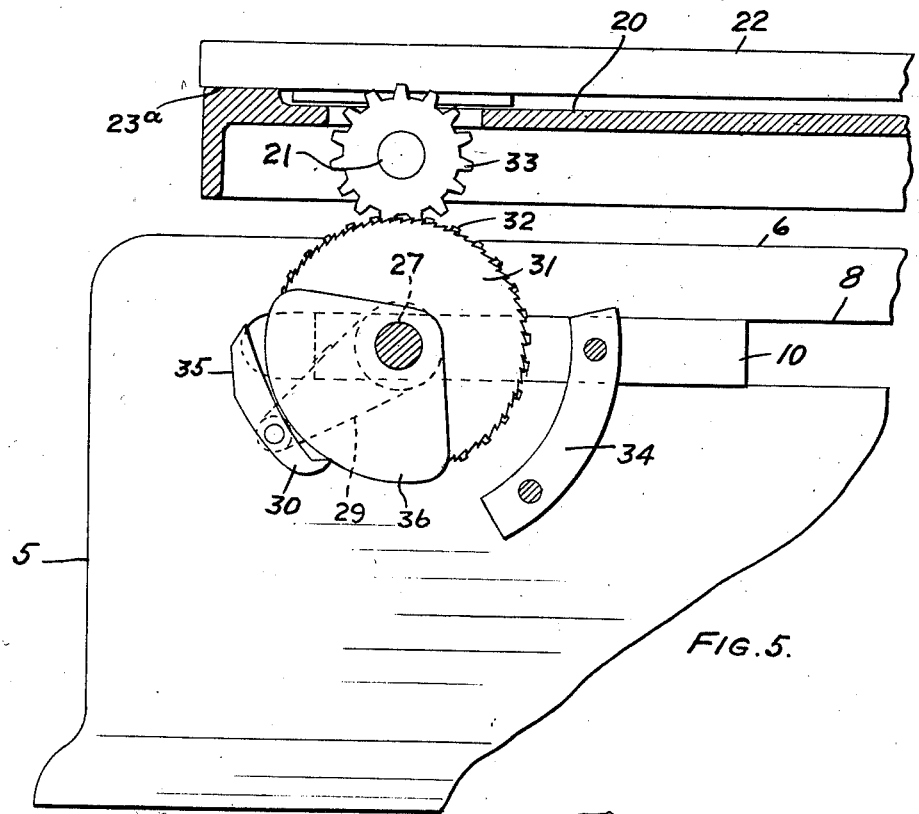
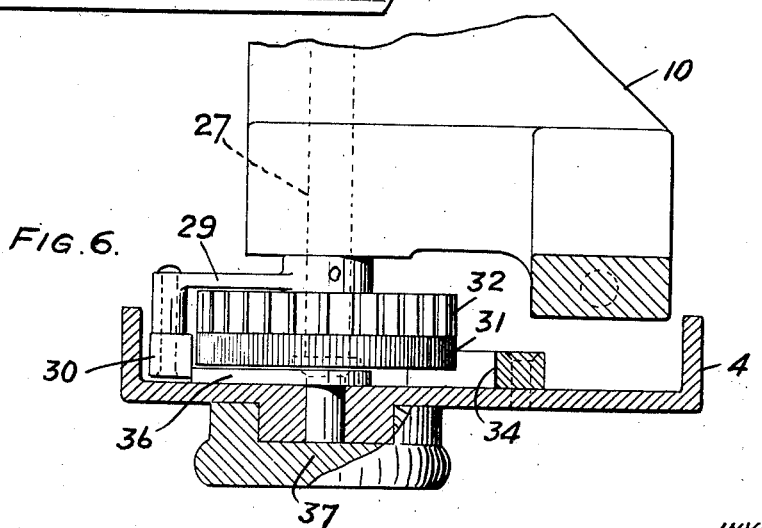

WILLIAM F. H. BRAUN, OF PHILADELPHIA, PENNSYLVANIA.

MEAT-SLICER.

1,366,764. Specification of Letters Patent. Patented Jan. 25, 1921.

Application filed May 29, 1920. Serial No. 385,143.

*To all whom it may concern:*

Be it known that I, WILLIAM F. H. BRAUN, a citizen of the United States, residing at Philadelphia, in the county of Philadelphia and State of Pennsylvania, have invented certain new and useful Improvements in Meat-Slicers, of which the following is a specification.

The principal objects of the present invention are, first, to simplify the construction and reduce the number of parts of meat slicers while providing a new and better meat feed, second, to obtain reciprocatory motion from the meat feed actuating mechanism whereby both the combination of parts and the mode of operation of the machine are improved, third, to simplify commutation of the parts for changing or adjusting the rate of feed of the meat, and fourth, to make the machine more efficient and direct acting and yet comparatively inexpensive and sanitary.

Other objects of the invention will appear from the following description which will be given of one embodiment of the invention chosen from other embodiments of the invention and the invention itself will be claimed at the end hereof, but first described in connection with the accompanying drawings forming part hereof and in which—

Fig. 3, is a transverse sectional view taken at the cutter shaft.

Fig. 4, is a similar view taken at the feed worm, and

Figs. 5 and 6, are sectional plan and elevational views, drawn to an enlarged scale, and illustrating feed commutating or changing mechanism.

Figure 1:
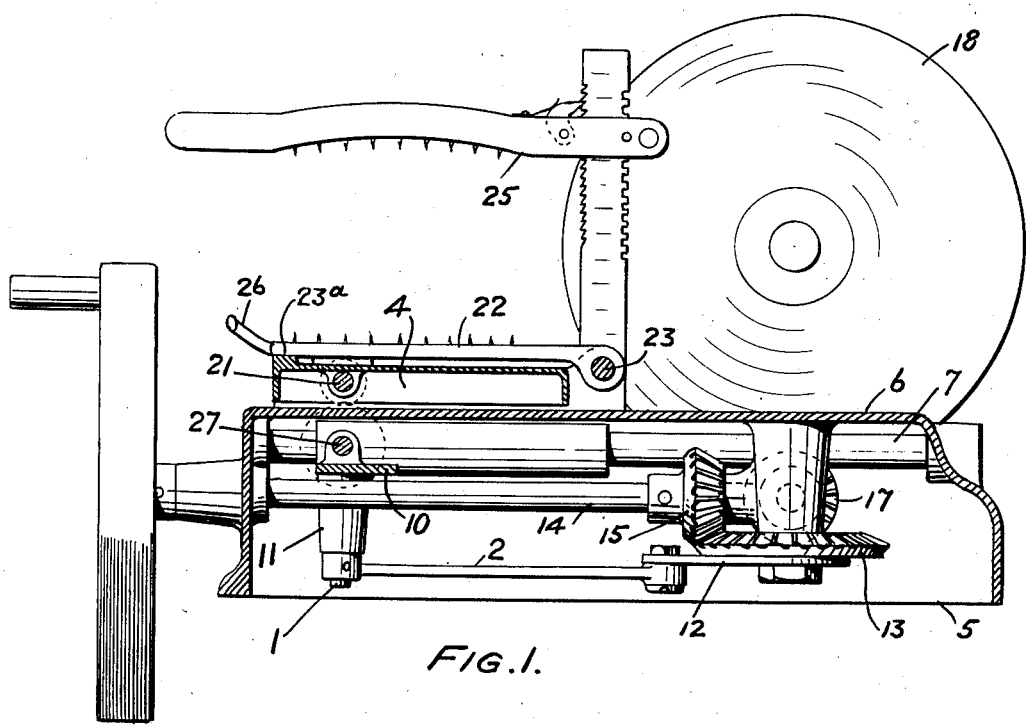
Figure 1, is a side view, partly in section, of the meat slicer.
Figure 2:
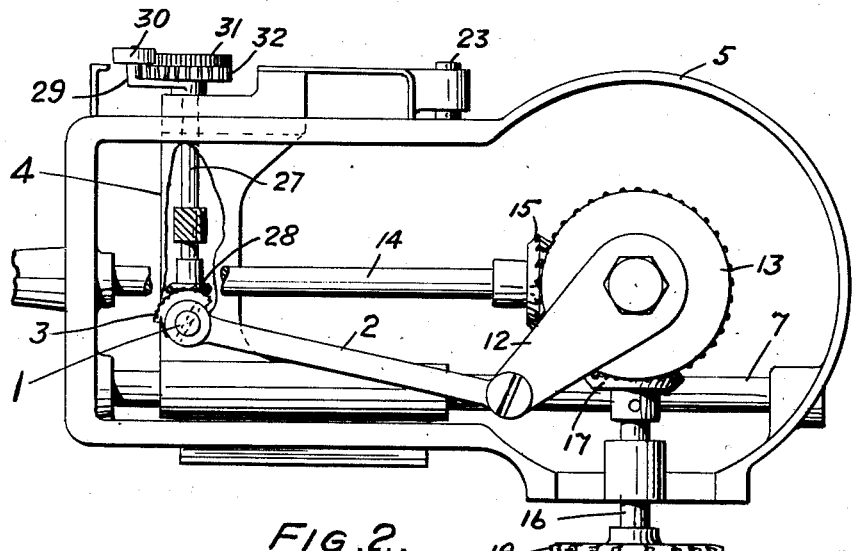
Fig. 2, is an inverted plan of the same with parts broken away.

In the drawings, the oscillating pin 1, and pitman rod or arm 2, and gear wheel 3 (shown as a quadrant) constitute a unitary element, novel in slicing machines, and they are relatively immovable, and the provision of this unitary element constitutes an important feature of the invention and simplifies and improves the construction and operation of the machine, as will appear from the following description.

The pin 1, is rotatably mounted in a traveler collectively indicated by the numeral 4. The traveler 4, is reciprocatingly mounted in part below and in part above the closed top surface 6, of a bed 5, provided with a guide rod 7, and with slots 8 and 9, arranged in its side walls. The part 10, of the traveler, below the top surface 6, of the bed is sleeved to slide on the rod 7, and it also slides in the slot 8, and extends through the slot 9. This part 10, of the traveler is also provided with a bearing 11, in which the pin 1, is mounted for oscillation with the pitman arm 2, below and the toothed quadrant 3, above the part 10. The crank arm 12, is fast on the bevel gear 13, and is connected to the pitman arm 2, of the pin 1, which latter not only serves to connect the crank 12, with the traveler 4, but also serves to operate the quadrant 3. The main shaft 14, operating through the beveled pinion 15, is a means for driving the bevel wheel 13, and the bevel wheel 13, drives the cutter shaft 16, through the bevel wheel 17. The cutter 18, is geared to the shaft 16, by chain and sprocket wheel gearing 19. The part 20, of the traveler 4, above the top 6, of the bed is equipped with a worm-feed shaft 21, and with a meat table 22, slidably and turnably mounted as on the rod 23, and guide 23ª, carried by the part 20, and the meat table 22, is provided with a half-nut 24, (engageable with the worm) and with a meat clamp 25, and a handle 26, for turning it about the rod 23, and shifting it manually. The part 10, of the traveler 4, is provided with an oscillating shaft 27, provided with a bevel gear 28, meshing with the quadrant 3, and also provided with a pawl-arm 29, having a pawl 30. Loose on the shaft 27, are an interconnected pawl or ratchet wheel 31, and a gear or toothed wheel 32, and the latter, 32, meshes with a pinion 33, on worm shaft 21.

The oscillation of the pivot pin 1, as the crank 12, reciprocates the traveler and meat table lengthwise of the bed, operates through the quadrant 3, gear 28, shaft 27, arm 29, pawl 30, pawl-wheel 31, gears 32 and 33, and worm shaft 21, to feed the meat table 22 crosswise of the traveler 4, and of the machine and this feed is timed to occur when the traveler is farthest from the cutter 18. To control and adjust the effective throw of the pawl 30, use is made of cams. 34, is a fixed cam arranged to operate on the tail 35, of the pawl and throw it out of action, and 36, is an adjustable cam turnable by the handle 37, and adapted to act under the toe of pawl 30 to fix its coming into action. Thus the arc of travel of the pawl may be long enough to permit it to feed only when the traveler and meat table are at or near the lefthand end of their travel, as shown in the drawings, and the degree of feed for each stroke of the pawl can be nicely and accurately adjusted by turning the handle 37.

By rigidly connecting the pivot pin 1, with the pitman arm 2, and permitting the pin to oscillate, there is provided a source of oscillating motion on the traveler, and from the foregoing description it is evident that the selection of this pin 1, as a means for operating the meat carriage feed simplifies and reduces the number of parts of the construction and improves the operation of the machine and is a novel and important feature of the invention.

It will be obvious to those skilled in the art that modifications may be made in details of construction and arrangement without departing from the spirit of the invention which is not limited as to those matters or otherwise than the prior art or the appended claims may require.

I claim:

1. In a meat slicer the combination of a bed having a solid top surface and provided beneath the top with a rail and at its side walls with lateral slots, a traveler arranged above and below the top of the bed and slidable on said rail and extending through said slots, a meat table feed worm mounted under and through the part of the traveler located above the top of the bed, a pawl-shaft arranged on the part of the traveler located beneath the top of the bed, pawl-and-ratchet wheel connections between the worm and rock shaft, and a pitman-arm-pin connected with the part of the traveler located under the top of the table and geared to said rock shaft, substantially as described.

2. In a meat slicer the combination of a reciprocatory traveler, a meat table, a feed-worm for the table carried by the traveler, a pawl-wheel for driving the worm, a shaft carried by the traveler and provided with a pawl arm and with a toothed driven wheel, a pitman-arm-pin provided with a driving gear wheel meshing with the driven toothed wheel, a pawl on the arm, and a movably adjustable cam operating on the pawl to control its effective throw, substantially as described.

3. In a meat slicer the combination of a pin, a pitman rod arm rigid with the pin and by which the pin is both oscillatable about its axis and given reciprocating motion translation, a reciprocating traveler connected with the pin, and a meat table feed connected with the pin and oscillated thereby, substantially as described.

4. In a meat slicer the combination of a reciprocatory traveler provided with an oscillating feed mechanism, a meat-table carried by the traveler and fed by said feed mechanism, and a pin oscillatably mounted in the traveler and which constitutes a part of the feed mechanism and a means by which the traveler is moved, substantially as described.

5. In a meat slicer the combination of a reciprocatory traveler provided with a meat-table and with an oscillatory meat table feed mechanism, a pin journaled to the traveler and geared to the feed mechanism, and crank mechanism connected with the pin to oscillate it, substantially as described.

6. In a meat slicer the combination of a reciprocatory traveler, means for reciprocating the traveler, a meat table movable crosswise of the traveler, mechanism carried by the traveler for feeding the table, and a pin oscillatably mounted in the traveler and by which the reciprocating means are connected to the traveler and by which the feed mechanism is directly actuated.

7. In a meat slicer the combination of a reciprocatory traveler, a meat table and a pawl driven worm for moving the meat table crosswise of the direction of the reciprocation of the traveler, a pawl-arm-rock-shaft carried by the traveler for actuating the pawl driven worm and feeding the meat table in respect to the traveler, a pin oscillatably connected with the traveler and geared to the rock shaft, and a pitman arm rigid with the pin for oscillating it and giving it and the traveler motion of translation.

8. In a meat slicer the combination of a reciprocatory traveler provided with a meat-table and with an oscillatory meat-table-feed, and combined feed and traveler actuating mechanism including a pair of interconnected crank arms of which one is rotary about a fixed center and of which the other is oscillatory about a pivot pin provided on the traveler and connected with the feed mechanism, substantially as described.

9. In a meat slicer the combination of a reciprocatory traveler provided with a crosswise movable meat-table, a pin mounted in the traveler and provided with a toothed driving gear and with a pitman arm, a worm for feeding the table, commutatable pawl and ratchet connections for actuating the worm, a shaft carried by the table and provided with a driven gear wheel meshing with the driving gear and with a pawl-arm, and a crank-arm connected with the pitman arm for reciprocating and oscillating it, substantially as described.

10. In a meat slicing machine the combination of an oscillatory meat feed, feed actuating mechanism consisting of interconnected arms of which one describes a circle about a fixed center element and of which the other swings about a movable center element which oscillates the feed, and a reciprocatory table carrying the feed and connected with the last named center element, substantially as described.

WILLIAM F. H. BRAUN.